(12) United States Patent
Whittington

(10) Patent No.: US 7,452,399 B2
(45) Date of Patent: Nov. 18, 2008

(54) COATING FOR FERTILIZER

(76) Inventor: Albert A. Whittington, Longreen Fertilizer Inc., Mulberry, FL (US) 33860

( * ) Notice: Subject to any disclaimer, the term of this patent is extended or adjusted under 35 U.S.C. 154(b) by 1099 days.

(21) Appl. No.: 10/682,347

(22) Filed: Oct. 10, 2003

(65) Prior Publication Data

US 2005/0076687 A1    Apr. 14, 2005

(51) Int. Cl.
*C05D 9/00* (2006.01)
*C05D 9/02* (2006.01)

(52) U.S. Cl. .......................................... 71/63; 71/64.07
(58) Field of Classification Search .............. 71/64.07, 71/63
See application file for complete search history.

(56) References Cited

U.S. PATENT DOCUMENTS

| | | |
|---|---|---|
| 3,264,089 A | 8/1966 | Hanson |
| 4,015,970 A * | 4/1977 | Hennart .......................... 71/11 |
| 4,711,659 A | 12/1987 | Moore |
| 5,454,851 A | 10/1995 | Zlotnikov et al. |
| 5,538,531 A | 7/1996 | Hudson et al. |
| 5,547,486 A | 8/1996 | Detrick et al. |
| 6,152,981 A | 11/2000 | Markusch et al. |
| 6,231,633 B1 * | 5/2001 | Hirano et al. .............. 71/64.07 |
| 6,322,606 B1 | 11/2001 | Komoriya et al. |
| 6,503,288 B1 * | 1/2003 | Markusch .................. 71/64.07 |

* cited by examiner

*Primary Examiner*—Wayne Langel
(74) *Attorney, Agent, or Firm*—Richard C. Litman

(57) ABSTRACT

Method and apparatus for coating fertilizer in pellet or other form to impart time-release characteristics and the resulting coated pellet product. The polyurethane coating encapsulates fertilizer particles, forming a hydrophobic coating for slow-release qualities. The urethane polymer coating is formulated with an isocyanate and a combined fluid of a polyether polyol, a methyl ester derivative of plant or vegetable oil, a T-12 curing catalyst, barium sulfate, and an oil-based dye. The barium sulfate imparts physical strength to and enhances color quality of the polyurethane coating, and acts as a detackifier and maintains temperature in the coating reactor. The inventive formulation is effective in the practical polymer coating of sulfate-based or other fertilizer pellets in an inventive time-release fertilizer product. An apparatus is provided for carrying out the coating process.

19 Claims, 2 Drawing Sheets

COATING FOR FERTILIZER

BACKGROUND OF THE INVENTION

1. Field of the Invention

The present invention relates to fertilizers. More particularly, the present invention relates to methods and apparatus for coating fertilizer in pellet form to impart time-release characteristics and the resulting coated pellet product.

2. Description of Related Art

Many attempts to provide a fertilizer product having a coating which provides for slow release of the fertilizer, rendering the fertilizer application effective over a long period of time, have been made. Many such processes suffer from sticky buildup in the coating equipment, leading to costly shutdown and cleaning of the apparatus. The products of the past lack sufficient abrasion resistance during handling, thus reducing the slow release properties of the fertilizer product. Prior colored coatings fall short in brightness and brilliance of desired colors for identification and marketability. It is desirable to provide a coated fertilizer product and process for coating resulting in improved abrasion resistance during handling while avoiding sticky buildup in the coating equipment. It is also desirable to provide these products in a selection of colors to improve identification and marketability. It would be desirable to provide for superior hydrophobic qualities to those demonstrated in prior products. It is desirable to provide a coated fertilizer which will not pollute the soil with undesirable chemical residues. It is desirable to provide a coated fertilizer which eliminates odor and dust during application to the soil. It is also desirable to provide an improved apparatus which is optimal to carry out the coating of fertilizer to obtain the desired coated product.

U.S. Pat. No. 3,264,089, issued Aug. 2, 1966, to Hanson, describes a method of making a slow release fertilizer granule product with a urethane resin coating.

U.S. Pat. No. 5,454,851, issued Oct. 3, 1995, to Zlotnikov et al., describes a method of making a slow release fertilizer product having an encapsulating, waterproofing sulfurated coating. Soybean oil may be used as a starting material therefor.

U.S. Pat. No. 5,538,531, issued Jul. 23, 1996, to Hudson et al. describes a method of making a controlled release fertilizer product of a polyisocyanate, a polyol having about the range of 2-6 hydroxyl moieties, and at least one alkyl moiety.

U.S. Pat. No. 4,711,659, issued Dec. 8, 1984, to Moore, describes a method of making a controlled release fertilizer product employing a polyisocyanate and a polyol separately sequentially applied along with a triethanolamine catalyst to form a urethane coating. The addition of fillers is contemplated.

U.S. Pat. No. 5,547,486, issued Aug. 20, 1996, to Detrick et al., describes an apparatus and mode of operation for sequential coating of fertilizer wherein a coating drum includes a plurality of sequential coating stations, each station having a single spray nozzle, for sequentially coating a batch of fertilizer moving through the drum with a plurality of coatings.

U.S. Pat. No. 6,152,981, issued Nov. 28, 2000, to Markusch et al. describes an isocyanate composition for coating fertilizer pellets. The class of coating compositions of the Markusch group of compounds all contains sulfur as a significant component.

U.S. Pat. No. 6,322,606 B1, issued Nov. 27, 2001, to Komoriya et al., describes a coated granular fertilizer having a film of polyurethane resin prepared by a method which includes the steps of (a) reacting an aromatic polyisocyanate with a first polyol component (i.e., castor oil or a castor oil derivative), to obtain a pre-polymer, and (b) reacting the pre-polymer with a second polyol component (i.e., castor oil or its derivative) and a third polyol which is an amine. Aqueous fluid-absorbing particles may be added to the composition.

None of the above inventions and patents, taken either singly or in combination, is seen to describe the instant invention as claimed.

SUMMARY OF THE INVENTION

The present invention relates to methods and apparatus for coating fertilizer in pellet or other form to impart time-release characteristics and the resulting coated pellet product. The polyurethane polymeric coating of the present invention encapsulates fertilizer particles to form a hydrophobic coating that slowly releases plant nutrients from the fertilizer particle into the soil in response to moisture and temperature. The coating is a urethane polymer formulated with a polyether polyol, a methyl ester derivative of plant or vegetable oil, a T-12 curing catalyst, barium sulfate, an oil-based color imparting dye (if desired), and an isocyanate. The barium sulfate imparts physical strength to the polyurethane coating, resulting a longer lasting coating. The barium sulfate also helps maintain reaction temperatures throughout the coating process. The inventive formulation allows for the practical polymer coating of a sulfate-based fertilizer pellet resulting in an inventive time-release fertilizer pellet of the present invention. An inventive apparatus is provided for carrying out the inventive coating process and the handling of the coated product.

Accordingly, it is a principal object of the invention to provide a coated fertilizer product for slow release of plant nutrients which is highly abrasion resistant.

It is another object of the invention to provide a coated fertilizer product as above which is supplied in bright, brilliant colors.

It is a further object of the invention to provide a coated fertilizer product as above which has superior hydrophobic qualities.

It is yet a further object of the invention to provide a coated fertilizer product as above which leaves no toxic residue in the soil.

Still another object of the invention is to provide a coated fertilizer product as above which avoids dust and odor during the application step.

It is yet a further object of the invention to provide a process for making the above-mentioned coated fertilizer product.

Still another object of the invention is to provide a process as above which reduces sticky buildup in the coating equipment.

Yet another object of the invention is to provide an apparatus capable of producing the above-mentioned coated fertilizer product in an efficient manner according to the above-mentioned process.

It is an object of the invention to provide improved elements and arrangements thereof in an apparatus for the purposes described which is inexpensive, dependable and fully effective in accomplishing its intended purposes as embodied in the novel product, and method of making the product.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to methods and apparatus for coating fertilizer in pellet or other form to impart time-release characteristics and the resulting coated pellet product. The polyurethane polymeric coating of the present invention encapsulates fertilizer particles to form a hydrophobic coating that slowly releases plant nutrients from the fertilizer particle into the soil in response to moisture and temperature. The coating is a urethane polymer formulated with a polyether polyol, a methyl ester derivative of plant or vegetable oil, a T-12 curing catalyst, barium sulfate, an oil-based color imparting dye (if desired), and an isocyanate. The barium sulfate imparts physical strength to the polyurethane coating, resulting a longer lasting coating. The barium sulfate also is effective as a detackifier in avoiding polymer buildup on the coating apparatus. The inventive formulation allows for the practical polymer coating of a sulfate-based or other fertilizer pellet resulting in an inventive time-release fertilizer pellet of the present invention. An inventive apparatus is provided for carrying out the inventive coating process and the handling of the coated product.

Figure 1:
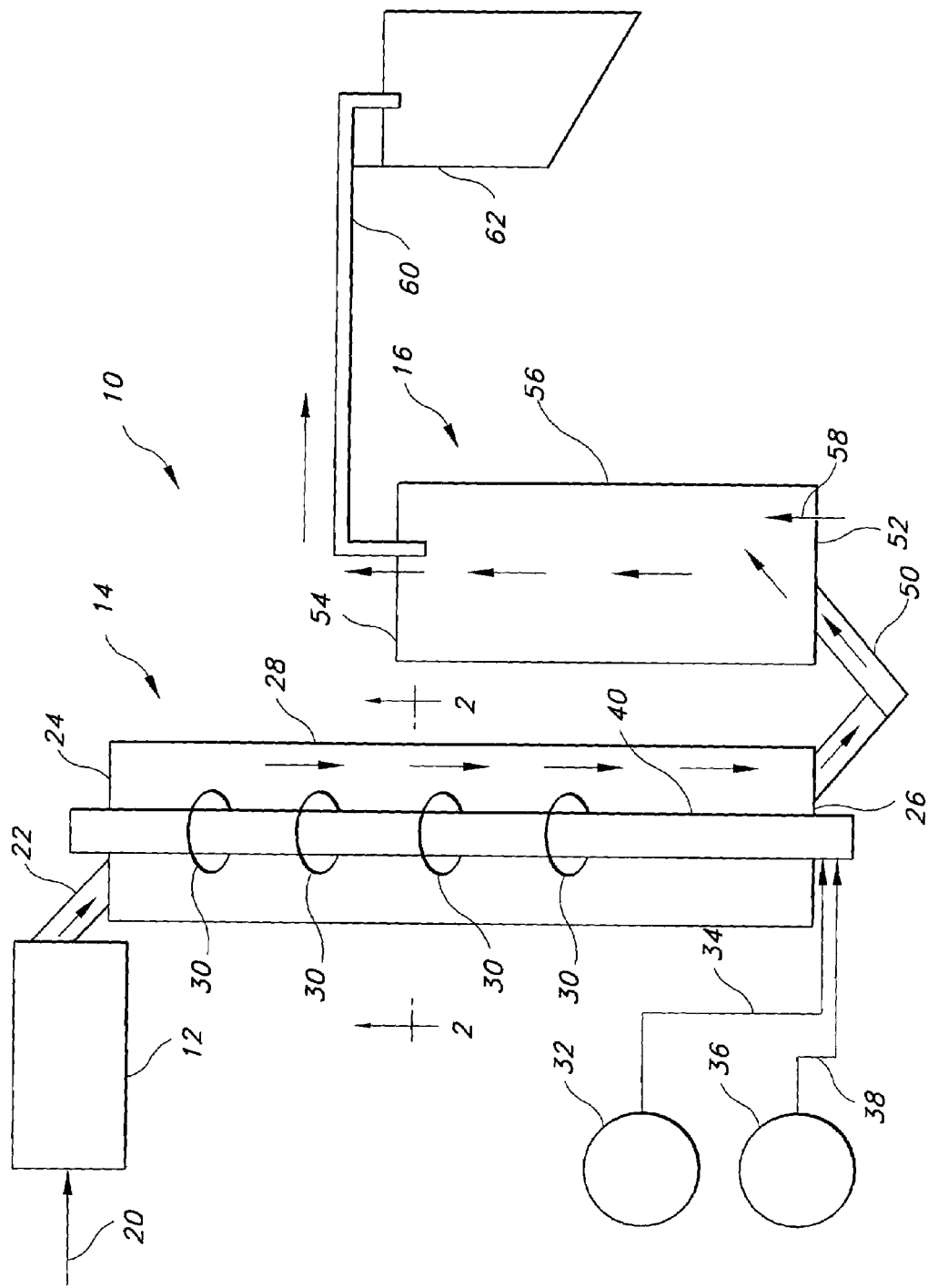
FIG. 1 is a diagrammatic plan view of an apparatus for coating fertilizer according to the present invention.
Figure 2:
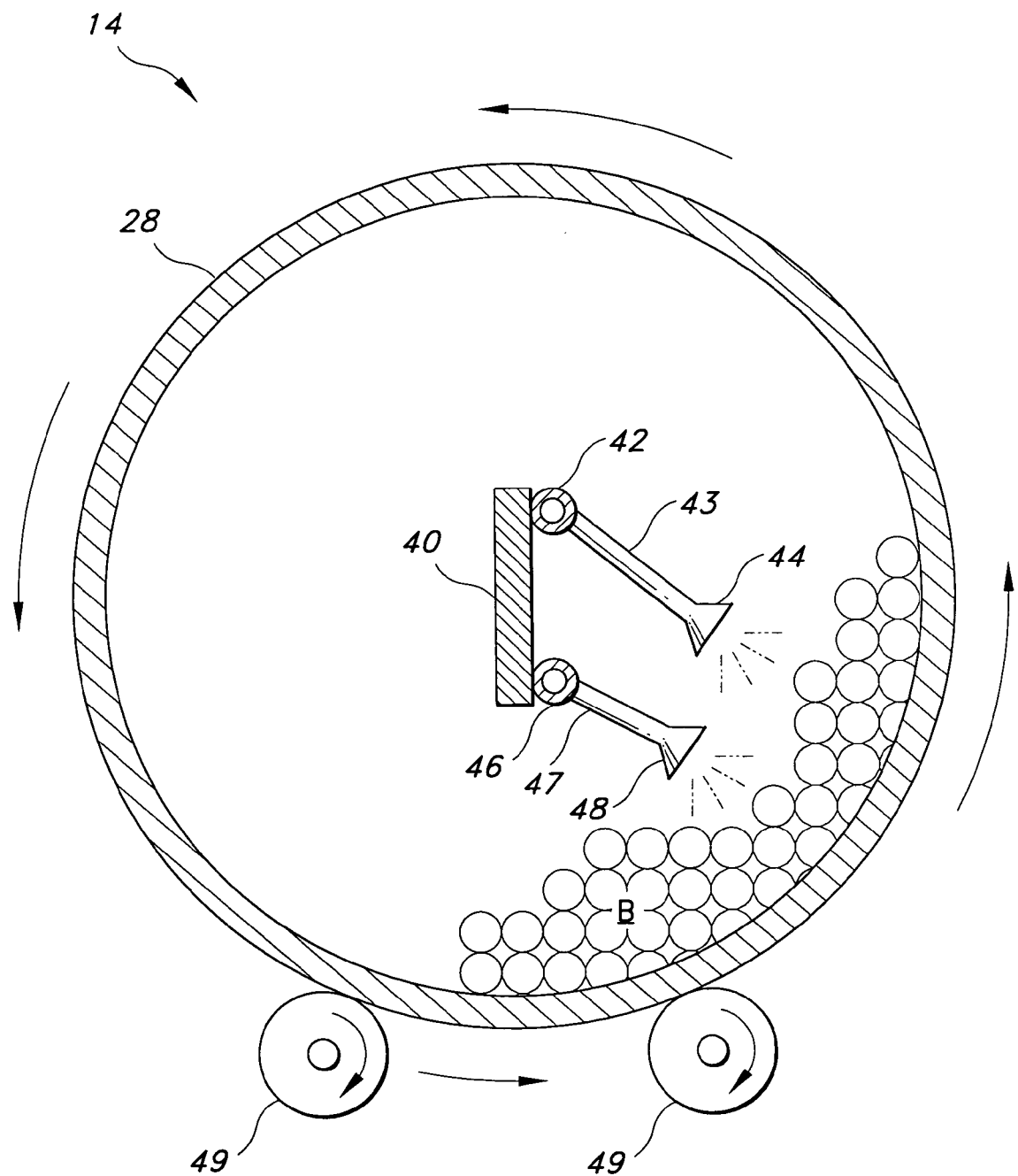
FIG. 2 is a diagrammatic section view drawn along lines 2-2 of FIG. 1.

Referring to FIGS. 1 and 2, there is shown a diagrammatical plan view of the fertilizer coating apparatus of the present invention and a cross sectional view of a coating drum of the coating apparatus illustrating a coating stage. Coating system generally designated as by the reference numeral 10 includes a rotating drum fertilizer heater and drier 12, a revolving coating drum 14, and a rotating drum product cooler 16. A fertilizer pellet feeder-conveyor 20 feeds bulk fertilizer into rotating drum drier and pre-heater 12 from which the dry, heated fertilizer is conveyed by coating drum feeder conveyor 22 to the entrance 24 of coating drum 14.

Coating drum 14 has a fertilizer entrance 24, a product exit 26, and a cylindrical wall 28 which rotates around a central axis during the coating operation. Coating drum 14 has four coating stages 30 as shown, but may be provided with fewer or more stages as desired, depending on the number of coats of coating are to be applied to the fertilizer pellet. Isocyanate tank 32 provides isocyanate through feed line 34 to stages 30 by means of header 42 (see FIG. 2). Combination fluid tank 36 provides a mixture of all other coating ingredients through feed line 38 to stages 30 by means of header 46 (see FIG. 2). Coating drum 14 is supported for rotation by rotating supports 49. Tank 36 may include a stirrer (not shown) for slowly stirring the mixture, thereby maintaining it in a mixed, fluid state.

Center beam coating station support 40 is located along the central axis of coating drum 14. Support 40 is fixed in place and extends the length of drum 14, serving as a support for isocyanate feed line 34, header 42 and nozzles 43 of stages 30. Support 40 also supports combination fluid feed line 38, header 46, and nozzles 47. Feed lines 34 and 38 are connected to respective headers 42 and 46 for supplying fluids thereto.

Coating stages 30 are each made up of a pair of nozzles 43 and 47 respectively spraying isocyanate and combination fluid through spray heads 44 and 48. As shown in FIG. 2, respective nozzles 43 and 47 are supported at the same location along support 40 and respectively spray isocyanate and combination fluid upon fertilizer bed B at the same location relative to rotating coating drum 14 as fertilizer bed B travels from the drum entrance 24 to drum product exit 26. At each stage 30 the isocyanate and the combination fluid are simultaneously sprayed on the fertilizer pellet bed B where they react to form a coating on each of the tumbling fertilizer pellets. The drum 28 revolves, exposing individual pellets to the reactant sprays, thus providing for a coating on individual pellets and avoiding agglomeration of pellets during the coating reaction. The number of coatings applied to the fertilizer pellets corresponds to the number of stages 30 provided in the coating drum 14. A desired temperature for the preheated pellets is maintained as they travel through the coating drum 14 due to the exothermic nature of the coating reaction in each stage 30.

Hot coated product pellets are collected and removed at coating drum product exit 26 by product collector and conveyer 50 and thereby fed to the entrance 52 of cooling and retention rotating drum 16. The product pellets travel through drum 16 along rotating wall 56 and exit at cooling drum exit 54 along with the cooling air supplied at entrance 52 at cooling air entrance 58. The cooled product pellets are collected and conveyed by conveyor 60 to storage bin 62.

The above-described apparatus is useful for carrying out the inventive fertilizer pellet coating process. The fertilizer particles are dried and preheated to a temperature of from about 125-150 degrees F. and preferably to about 130 degrees F. in the preheater and drier 12 to remove any moisture that may be present on the water-soluble fertilizers to be coated. The heating also acts as a stimulus to start the coating process and speed the polymer coating reaction and avoids the formation of bubbles between the fertilizer pellet and the coating. Although a revolving drum type preheater and drier is preferred, any equivalent apparatus may be employed such as a fluidized bed.

The hot, dry fertilizer particles or pellets are fed to the rotating coating drum where they enter the first coating stage. In the preferred embodiment, isocyanate such as Isocyate 143L Modified MDI (Dow Chemical) and combination fluid consisting of a mixture of Desmophen 550U polyether polyol (Bayer Chemical), a methyl ester plant or vegetable oil derivative (OceanAir Environmental), dibutyltin dilaurate (T-12 catalyst)(Air Products), barium sulfate (Cimbar Company), and, if desired, a desired color oil-based dye (Keystone Analine Corp.) are reacted to form the desired urethane coating. Other materials such as pesticides and micro-nutrients may be included in the combination fluid as desired. An exothermic reaction occurs between the isocyanate and the combination fluid forming the first polymer coating on the fertilizer pellets.

As the coated pellets travel through coating drum 14, they encounter three additional stages similar to the first stage as above, where additional coatings of polymer are applied. The exothermic reaction in forming the urethane polymer coating maintains the pellets at the desired temperature for reaction throughout the four stage coating process. Fewer coatings may be provided by reducing the number of coating stages. Additional stages may be provided to increase the number of coatings on the product fertilizer pellets.

The coated product exits the coating drum 14 in a nontacky, free-flowing state. The product is then fed to a rotary cooling drum 16 or equivalent apparatus for exposure to cooling ambient air for about four minutes to allow for final curing before being conveyed to storage.

The coating drum 14 is preferably about 7 ft. in diameter and 60 ft. long with a pitch of about 15 degrees downward from entrance 24 to exit 26. There are preferably four coating stations 30 spaced approximately 10 ft. apart extending along the length of the coating drum 14.

Examples of isocyanate pre-polymers useful in the present invention include MDI diphenylmethane diisocyanate, TDT toluene diisocyanate and PAPI polymeric diphenylmethane diisocyanate.

Examples of polylols useful in the present invention include polyester polyol, polyether polyol, and polyethylene glycol.

Examples of catalysts useful in the present invention are T-12 dibutyl tin dilaurate, triethylene diamine, and methyl diethanol amine.

Examples of diluents and extenders useful in the present invention include plant/vegetable oils such as cotton seed oil, linseed oil, soybean oil; etc.; waxes, such as paraffin, micro crystalline waxes, etc.; and powders such barium sulfate, diatomaceous earth, calcium carbonate, clays, silicas, etc.

In the preferred embodiment of the present invention, methyl esters of plant/vegetable oils are employed as the hydrophobic component as well as an extender. It is believed that the use of straight methyl esters of plant-derived oils such as soybean oil in the polymer coating formula as in the present invention is novel.

In the preferred embodiment of the present invention, barium sulfate is employed not only as a thickener and extender but also as a detackifier, eliminating sticky buildup on the interior of the coating apparatus. The barium sulfate also imparts abrasion resistance to the coating. It has been observed during tests that the coated fertilizer pellets or granules become non-tacky more quickly and exhibit less agglomeration with barium sulfate in the formula. The use of barium sulfate also helps maintain the desired temperature throughout the coating drum, thus promoting the polymerization reaction in the coating stages. The use of barium sulfate in the polymer coating when used with oil-based dyes result in distinct, brilliant, high gloss color in the fertilizer polymer coating.

Customers of polymer coated fertilizers desire the ability to distinguish different fertilizers by their coating colors. It has been found that oil-based dyes are most effective in urethane coating systems as the colors are dispersed more evenly and quickly than pigments therein. Thus, the use of oil-based dyes and barium sulfate as a thickener and extender is preferred in the practice of the present invention.

A preferred formulation for the components of the present invention include, for coating one pound of fertilizer with one coat of polymer coating: (1) six (6). grams Isonate 143L modified MDI and; (2) a combination fluid comprising:
  (a) three (3) grams Desmophen 550U polyether polyol;
  (b) three (3) grams soybean oil methyl ester;
  (c) one-fourth (¼) gram dibutyl tin dilaurate (T-12 catalyst);
  (d) three (3) grams barium sulfate; and
  (e) a variable quantity of oil-based dye depending on desired color.

Although the above-listed ingredients formulation results in the best performing coating, the formulation may be varied in relative amounts of ingredients to change the characteristics of the resulting polymer coating.

The present inventive coating process and apparatus is useful in coating a wide variety of fertilizers including sulfate-based fertilizers such as potassium sulfate. Examples of other fertilizers useful with the present invention include urea, ammonium sulfate, ammonium nitrate, diammonium phosphate, monoammonium phosphate, triple superphosphate, potassium nitrate, and potassium chloride. The inventive coating process is useful for coating fertilizers in a variety of forms including granules, chunky granules, prills, pellets, extrusions, shot, lumps, grains crystals, and flakes.

The combination fluid consists of a polyol plus other ingredients as listed above and typically has the consistency of paint. It is preferred practice to slowly stir the combination fluid during mixing and holding in the mixing tank until it is used in the coating process to maintain solids in suspension.

If desired, the combined fluid may contain pesticides and micro nutrients such as copper and zinc compounds which then become part of the coating.

EXAMPLE I

The following procedures and tests were carried out by Thornton Laboratories, Inc., Tampa, Fla., a Florida certified and NELAP accredited laboratory:

Detackifier Test

On may $10^{th}$ of 2002, two samples of the Whittington Formula for a polyurethane coating for slow release fertilizer was prepared, the first sample using a detackifier of barium sulfate and the second sample without a detackifier.

Sample 1.

The first sample was prepared as follows:

A. one pound of sulfate potash (barium sulfate) pellets was placed in a plastic bucket and rotated by hand for approximately two minutes, while a hot air from a hairdryer was blown directly on the pellets to preheat the sample to about 130 degrees F. while removing the surface moisture on the sample.

B. Three grams of isonate 143L Modified MDI (diphenylmethane diisocyanate) was poured on the preheated pellets of fertilizer and the bucket was shaken in a rotating motion for about ten seconds.

C. A combination fluid consisting of 1.4 grams Desmophin 550U Polyether Polyol, 1.5 grams of Methyl ester oil, 1.5 grams barium sulfate, 0.04 grams T-12 Catalyst (dibutyl tin dilaurate), and 0.08 grams of an oil-based color dye was prepared.

D. The combination fluid of step C totaling 4.62 grams was added to the fertilizer pellets and the bucket was again shaken in a rotating motion for about 10 seconds.

E. The bucket was slowly turned by hand for two minutes more, while heated air from the hairdryer was used to maintain heat of the sample during curing, the fertilizer pellets never exceeding 130 degrees F. is temperature.

F. The process of steps B thru E was repeated three times.

G. When the Contents of the bucket were dumped out, there was less than 0.5% (approximately 2.27 grams) of the sample remaining in the bucket.

Sample 2.

A one pound sample of sulfate potash was treated according to that of FIG. 1, however the 1.5 grams of barium sulfate was deleted from the combination fluid.

Contents of the bucket were dumped out in the manner of sample 1. About 50% of the one pound sample remained stuck to the inside surface of the plastic bucket.

CONCLUSION

The barium sulfate is effective as a detackifier for polyurethane coating of fertilizer pellets.

Other Observations:

The fertilizer holds its reaction temperature approximately ten minutes longer when barium sulfate is used in the reacting combination fluid as in sample 1, thus speeding curing time, as compared to fertilizer coated without barium sulfate present as in sample 2.

When barium sulfate is added to the combination fluid and the coated fertilizer is allowed to cool as in sample 1, the coating is much harder and more abrasion resistant than that on sample 2.

EXAMPLE II

A process was carried out by the inventor on Jul. 26, 2003, wherein particles of sulfate of potash (potassium sulfate) granules, obtained from H.J. Baker & Bro., Stamford, Conn., were coated with a slow release polymer according to the present invention. The test run was run outdoors on a day having high humidity. The test run was made according to the following procedure:

1. One pound of sulfate of potash (potassium sulfate) fertilizer pellets (grade 0-0-50) was placed in a plastic bucket and rotated by hand for approximately two minutes, while a hairdryer was used to direct heated air into the sample to preheat the sample to remove the surface moisture and heat the sample to about 130 degrees F.

2. Three grams of Isonate 143L Modified MDI (diphenylmethane diisocyanate) was poured on the preheated pellets of fertilizer and the bucket was shaken in a rotating motion for about 10 seconds.

3. A combination fluid consisting of a mixture of 1.5 grams of Desmophen 550U Polyether Glycol, 1.5 grams of Methyl ester Oil; 1.5 grams of barium sulfate, 0.04 grams of T-12 catalyst (dibutyl tin dilaurate), and 0.08 grams of an oil-based dye was added to the fertilizer pellets and the bucket was again shaken in a rotating motion for about 10 seconds.

4. The bucket was slowly turned by hand for approximately two minutes, while the hairdryer was used to maintain the heat of the sample during curing, the fertilizer pellets never exceeding 130 degrees F. in temperature.

5. The bucket was then turned occasionally for the next two minutes to allow cooling and a resulting finished cure of coated fertilizer pellets.

6. Steps 1 through 5 above were repeated three times, resulting in a coated fertilizer product having four coats of colored polymer coated fertilizer pellets.

Samples of the coated product were submitted to Thornton Laboratories, Inc., Tampa, Fla. for independent testing as follows:

A part of a first sample of the coated product was tested under method AOAC 958.02 for potassium, resulting in value of controlled release ($K_2O$) of 48.37% (the coating material accounts for the reduction from 50%.

Part of the sample was subjected to test method AOAC 970.04, Potassium ($K_2O$), for Controlled Release (SRN). This test indicates the amount of Potassium leached from the sample by water during a controlled test. The resulting sample had a value of water soluble ($K_2O$) of 0% indicating that no Potassium was lost from the sample during the test. This indicates the sample contained fully coated particles having a water impermeable character, a desired result.

Part of the sample was subjected to a 10 day dissolution test under a TVA method carried out in water @ 100 degrees F. The percent dissolution of Potassium ($K_2O$) after 10 days was measured to be 6.35, which indicates excellent time-release quality of the sample of coated fertilizer pellets or granules.

A part of a second sample of the coated product was tested under method AOAC 958.02 for potassium, resulting in value of water soluble ($K_2O$) of 48.27% (the coating material accounts for the reduction from 50%).

Part of the second sample was subjected to test method AOAC 970.04, Potassium ($K_2O$), for Controlled Release (SRN). This test indicates the amount of Potassium leached from the sample by water during a controlled test. The resulting sample had a value of water soluble ($K_2O$) of 48.27% indicating that no Potassium was lost from the sample during the test. This indicates the sample contained fully coated particles having a water impermeable character, a desired result.

Part of the second sample was subjected to a 10 day dissolution test under a TVA method carried out in water @ 100 degrees F. The percent dissolution of Potassium ($K_2O$) after 10 days was measured to be 4.99, which indicates excellent time-release quality of the sample of coated fertilizer pellets or granules.

Part of the second sample was subjected to an abrasion test under an IFDC method S-117 for abrasion resistance. Abrasion resistance is the resistance to the formation of dust and fines as a result of granule-to-granule and granule-to-equipment (including 5/16 inch steel balls). The test is useful in determining material losses; handling, storage, and application properties; and pollution control equipment requirements. The measured degradation was measured at 1.4 percent by weight in fines. This is a significant improvement over uncoated potassium sulfate fertilizer granules which exhibit 4.0 to 6.0 percent degradation by weight in fines.

The above examples demonstrate that a high quality, fully coated fertilizer product was obtained according to the present invention. The resistance to abrasion degradation demonstrates the hardness of the coated product according to the invention. The dissolution test results indicate the highly hydrophobic qualities obtained by use of the methyl ester oil as an extender resulting in a high quality time-release coated product.

It is to be understood that the present invention is not limited to the embodiments described above, but encompasses any and all embodiments within the scope of the following claims.

I claim:

1. A method for coating fertilizer particles to impart to them slow plant nutrient release comprising:
    preheating to from about 125 to 150 degrees F. and drying said fertilizer particles;
    simultaneously spraying said preheated particles with an isocyanate pre-polymer and a reacting combination fluid comprising:
        a polyol;
        a methyl ester derivative of a plant or vegetable oil;
        a polymerization catalyst; and
        a powder extender;
    reacting said isocyanate pre-polymer and said reacting combination fluid to form a polymer coating on said fertilizer particles; and
    cooling said coated fertilizer particles to form a slow release fertilizer product.

2. The method of claim 1, wherein said powder extender in said reacting combination fluid comprises barium sulfate.

3. The process of claim 1, wherein said reacting combination fluid further comprises an oil-based dye.

4. The method of claim 1, wherein said isocyanate pre-polymer is selected from the group consisting of diphenylmethane diisocyanate, toluene diisocyanate, and polymeric diphenylmethane diisocyanate.

5. The method of claim 1, wherein said polyol is selected from the group consisting of polyester polyol, polyether polyol, and polyethylene glycol.

6. The method of claim 1, wherein said polymerization catalyst is selected from the group consisting of dibutyl tin dilaurate, triethylene diamine, and methyl diethanol amine.

7. The method of claim 1, wherein said methyl ester derivative of the plant or vegetable oil is selected from the group consisting of methyl esters of cotton seed oil, linseed oil, and soybean oil.

8. The method of claim 1, wherein said reacting combination fluid further comprises plant or vegetable oils selected from the group consisting of cotton seed oil, linseed oil, waxes selected from the group consisting of paraffin and micro-crystalline waxes, and powders selected from the group consisting of diatomaceous earth, calcium carbonate, clays, and silica.

9. The method of claim 1, wherein said spraying step and reacting steps are repeated a number of times corresponding to the number of layers of coating desired on said fertilizer particles.

10. The method of claim 2, wherein for each pound of fertilizer particles coated, about six grams of said isocyanate pre-polymer and said reacting combination fluid comprising about three grams polyether polyol, about three grams soy bean oil methyl ester, about one-fourth gram dibutyl tin dilaurate catalyst, and about three grams barium sulfate are applied by spraying.

11. The method of claim 10, wherein said reacting combination fluid further comprises a quantity of oil-based dye.

12. The method of claim 1, wherein said reacting combination fluid further comprises micro-nutrients, said micro-nutrients being selected from the group consisting of copper compounds and zinc compounds.

13. The method of claim 1, wherein said reacting combination fluid further comprises pesticides.

14. The method of claim 10, wherein said spraying step and said reacting step are repeated plurality of times resulting in a corresponding plurality of coating layers on said fertilizer particles.

15. The method of claim 14, wherein said spraying and reacting steps are successively carried out in stages as said fertilizer particles travel through a multi-stage coating drum resulting in fertilizer particles having four coatings.

16. The method of claim 15, wherein there are four spraying and reacting steps carried out in four stages.

17. The method of claim 1, wherein said fertilizer particles are selected from the group consisting of granules, chunky granules, prills, pellets, extrusion, shot, lumps, grains, crystals, and flakes.

18. The method of claim 17, wherein said fertilizer particles consist of sulfate based fertilizers.

19. The method of claim 18, wherein said fertilizer particles consist of potassium sulfate.

* * * * *